(12) United States Patent
Dexter

(10) Patent No.: US 9,873,367 B2
(45) Date of Patent: Jan. 23, 2018

(54) COVER WITH CORNER CAP FOR OPEN ENCLOSURE

(71) Applicant: Tim Dexter, Orland, CA (US)

(72) Inventor: Tim Dexter, Orland, CA (US)

( * ) Notice: Subject to any disclaimer, the term of this patent is extended or adjusted under 35 U.S.C. 154(b) by 0 days.

(21) Appl. No.: 14/817,428

(22) Filed: Aug. 4, 2015

(65) Prior Publication Data

US 2016/0339827 A1 Nov. 24, 2016

Related U.S. Application Data

(63) Continuation of application No. 62/179,716, filed on May 18, 2015.

(51) Int. Cl.
*B60P 7/00* (2006.01)
*B60P 7/08* (2006.01)

(52) U.S. Cl.
CPC .................... *B60P 7/0876* (2013.01)

(58) Field of Classification Search
CPC ...................................... B60P 7/0876
USPC ....... 410/96, 97, 100, 117, 118; 296/100.15, 296/100.16; 160/290.1, 266; 248/499; 24/115 K, 265 CD
See application file for complete search history.

(56) References Cited

U.S. PATENT DOCUMENTS 8,292,559 B1 * 10/2012 Foggy .................. B60P 7/0876
410/96
8,414,060 B2 * 4/2013 Demedash ................ B60P 7/02
296/100.16

* cited by examiner

*Primary Examiner* — Stephen Gordon
(74) *Attorney, Agent, or Firm* — Lynette Wylie; Apex Juris, pllc.

(57) ABSTRACT

The present invention comprises an assembly and method for a fastener assembly for securing a flexible cover over an open enclosure employing corner members coupleable with angled corners of the open enclosure, a plurality of removeably attachable tie down members and fastening members and a strap for securing the flexible cover about the open enclosure and any cargo therein, and is particularly preferred to be used with a tarpaulin cover for a truck bed to provide a user friendly, efficient system for tying down cargo being transported in truck beds.

13 Claims, 4 Drawing Sheets

COVER WITH CORNER CAP FOR OPEN ENCLOSURE

CROSS-REFERENCE TO RELATED APPLICATION

This application claims the benefit of U.S. Provisional Patent Application Ser. No. 62/179,716 filed on May 18, 2015.

BACKGROUND OF THE INVENTION

The present invention generally relates to securing a cover onto an open container, and more particularly relates to securing a tarp or tarpaulin onto a truck bed. Trucks generally have an open truck bed enabling transportation of variously sized and shaped cargo which may protrude above the sidewalls of the bed. However, cargo in an open truck bed is exposed to aerodynamic dislodging of loose cargo. Such dislodged objects pose a danger of striking to adjacent traffic, pedestrians or nearby objects. Indeed, severe injury resulting from the impact on drivers of vehicles struck by thus dislodged has resulted in strict legislation prohibiting hauling of loads without secured covers on truck beds or similar open containers transporting cargo. Heavy fines are levied for violations of these prohibitions.

Additional disadvantages of uncovered cargo in truck beds or similar open containers result from damage due to exposure to environmental elements such as sun, sleet, snow, rain, wind and pollution. To prevent such exposure of cargo, systems using tarpaulins and similar covers have been used to cover and restrain truck bed.

Conventional cargo restraining systems traditionally consist of a tarpaulin or other flat textile cover and a rope, bungee cords or tensioning straps securing it to the sides of the truck bed. Eyelets around the periphery for threading or hooking ropes or cords for securing to anchor points on the sides of the bed or container are commonly utilized. These anchor points are usually mounted onto the sides of the truck bed and may permanently damage the truck of restraining cargo using a tarpaulin bed. Bungee cords are usually secured via hooks attached to its ends. Unfortunately such prior art systems require numerous anchor points, ties, and hooks, which are cumbersome, and tiresome, particularly when employed by one person to secure a tarpaulin about an large or unwieldy load. Moreover, sharp ends of hooks and other hardware utilized in such systems may inflict damage thereto. Therefore, improved systems and methods, which are more secure and less damaging to the truck bed, are desired.

SUMMARY OF THE INVENTION

The present invention provides a fastener assembly and method for attaching a flexible cover, such as a tarpaulin, over an open enclosure, such as a truck bed, employing a triangulate corner member configured for coupled mounting about a corner thereof. The triangulate corner member employs a fastener mechanism to fasten to or over the flexible cover and in conjunction with a plurality of tie downs, such as elasticized cords commercially known as bungee cords, anchored to the open enclosure by fastener members employing known techniques are employed to orient and secure the flexible cover over the opening of the open enclosure, as further described in detail below. The fastener assembly according to the present invention is adaptively fastenable, and therefore customizable to fit, variably configured and sized truck beds and flexible covers.

More particularly, the present invention provides a fastener assembly for securing a flexible cover about an open enclosure having angled corners, comprising at least one triangulate corner member coupleably mountable upon the angled corners of the open enclosure, wherein the corner member has a fastener mechanism for detachable fastening to the flexible cover to thereby keep the flexible cover over the open enclosure in a generally longitudinally aligned orientation, one or more tie down members removeably attachable to the flexible cover, and a plurality of fastener members removeably attachable to the tie down members and the open enclosure, whereby simultaneously attaching the plurality of fastener members to the tie down members and the open enclosure secure the flexible cover over the opening of the open enclosure.

In preferred embodiments, the one or more tie down members comprise flexible cords having a plurality of fastener points and the flexible cover has a plurality of corresponding attachment points spaced along the flexible cover at intervals for removeably attaching fastener members to opposing side surfaces of the open enclosure so as to maintain the flexible cover in a stationary, uniformly smooth and tightly extended position. Preferred embodiments of the present invention also provide magnet stays for orienting anchor members along the opposing side surfaces of the open enclosure until securing the anchor members to the open enclosure. In addition, preferred embodiments provide reinforcement material surrounding the attachment points spaced along the flexible cover. It is particularly preferred that the fastener mechanism comprises at least one first fastener strip, such as a flexible loop material, on the triangulate corner member is coactively attachable to a corresponding second fastener strip, such as a flexible hook material, and configured and affixed on the flexible cover such that coupled engagement of the first fastener strip and the second fastener strip affixes the flexible cover to the triangulate corner cap so as to generally align the flexible cover with the longitudinal axis of the opening of the open enclosure, such as, the truck bed and the one or more tie down members comprises an elasticized cord for adaptive attachment over the flexible cover.

In an alternative embodiment, the fastener mechanism comprises at least one eyelet oriented and configured for adaptive, coupled engagement with a corresponding tie down member to thereby secure the flexible cover over the opening of the open enclosure and any cargo therein. Another embodiment provides the elasticized cords be interlaced to form a flexible web over the open enclosure and any cargo therein.

The fastener mechanism of alternative embodiments may feature a locking lever oriented and configured for adaptive coupled engagement with a corresponding removeably engageable strap for fastening about the flexible cover to thereby secure the flexible cover over the opening of the open enclosure and any cargo therein. In a preferred embodiment of the latter fastener assembly, the locking lever is ratcheted to adaptively tighten the tie down member such that the flexible cover is thereby tautly secured over the opening of the open enclosure and any cargo therein.

In yet an additional alternative embodiment, the present invention provides at least two triangulate corner members configured and spaced apart for mounted coupling upon perpendicular corners formed where the forward end surface and two opposing side surfaces of the truck bed meet along a strap of a sufficient length between a first end and a second end for enclosing a generally rectangular outer perimeter of the truck bed extending around a forward end surface, a rear end surface and two opposing side surfaces upon closure of the first end and second end, whereby closure of the strap secures the flexible cover about the perimeter of the open truck bed and any cargo therein. The latter embodiments further preferably provides a releasable closure mechanism for connecting the first end of the strap with the second end of the strap to thereby secure the strap about the outer perimeter of the truck bed. The releasable closure mechanism preferably comprises a locking lever and has a ratchet mechanism to adaptively tighten the tie down member such that the flexible cover is thereby tautly secured over the opening of the open enclosure and any cargo therein.

The present invention yet further provides a method for securing a flexible cover around an open truck bed, comprising the steps of: securing triangulate corner members configured for mounted coupling onto corresponding corners formed by perpendicularly aligned vertically disposed outer surface of the truck bed; attaching the flexible cover to the triangulate corner members, mounting the flexible cover over the open truck bed, attaching the flexible cover to the triangulate corner members; and fastening a plurality of tie down members to opposing sides of the truck bed to thereby secure the flexible cover over truck bed and any cargo therein.

The latter method may further entail the step of securing triangulate corner members configured for mounted coupling onto corresponding corners formed by perpendicularly aligned vertically disposed outer surfaces of the truck bed further comprises affixing the triangulate corner members to a flexible cord in spaced intervals such that securing opposing open ends of the flexible cord couples the triangulate corners to the corners of the truck bed thereby secures the flexible cord in taut generally horizontal alignment about a portion of the vertically disposed outer surface of the truck bed.

In preferred embodiments, the method includes the further steps of positioning tie down attachment points at spaced intervals along the flexible cover, attaching one or more flexible cords to the tie down attachment points, and anchoring the plurality of tie down members to opposing side surfaces to thereby secure the flexible cover in generally longitudinally aligned, stationary, uniformly smooth and tightly extended orientation about the perimeter of the truck bed and any cargo there. Particularly preferred embodiments also include the step of magnetically affixing the plurality of tie down members in place until the flexible cover is oriented.

Particularly preferred embodiments still further include attaching the flexible cover to the triangulate corner members by affixing coacting flexible loop and flexible hook material on the upper frontal portion of the triangulate corner member and the lower surface of the frontal portion of the flexible cover and thereby securing the portion of the tarp affixed to the triangulate corner member about a frontal portion of opposing sidewalls of the truck bed.

Fastening mechanisms with which the triangulate corner member of the present invention may be employed include a variety of tensioning means utilizing known tie down fastening system components, straps, rope, lines, or flexible members tightened and secured with buckles, straps, clasps, ratchets, hooks or other fastener mechanism applied to the flexible cord to secure the flexible cover to the open enclosure, for example, by pulling on the second end of the flexible cord. Alternatively, closure mechanisms for securing the strap in tightened closed alignment, such as, for example, buckles, clasps, locking levers or knots may be used. Also, the open enclosure may be provided with tie down hooks or anchors, and the flexible cord may be coupled between the plurality of fastening elements on the flexible cover and the tie down hooks or anchors of the open enclosure.

In some cases, the flexible cord may be passed through a plurality of eyelets of at least one side of the flexible cover and may further be passed through eyelets in a triangulate member, thereby coupling the flexible cord to the flexible cover.

Each of the fastening elements may comprise a clip for attaching the fastening elements to an edge of the flexible cover. They may also comprise a hook having one end for capturing the flexible cord. Furthermore, each fastening element may be padded, for example, with a soft foam outer covering or ring to avoid damage to the surface of the open enclosure or truck bed.

Each tie down member may further comprise a magnet stay which can magnetically affix a tie down member. Such magnetic tie down mechanisms enable positioning the flexible cover and tie down members and anchor members thereof with ease, even by a single user, prior to tightly anchoring the first tie down member over the flexible cover over the truck bed or other open enclosure and any cargo therein.

DETAILED DESCRIPTION OF THE INVENTION

Figure 1:
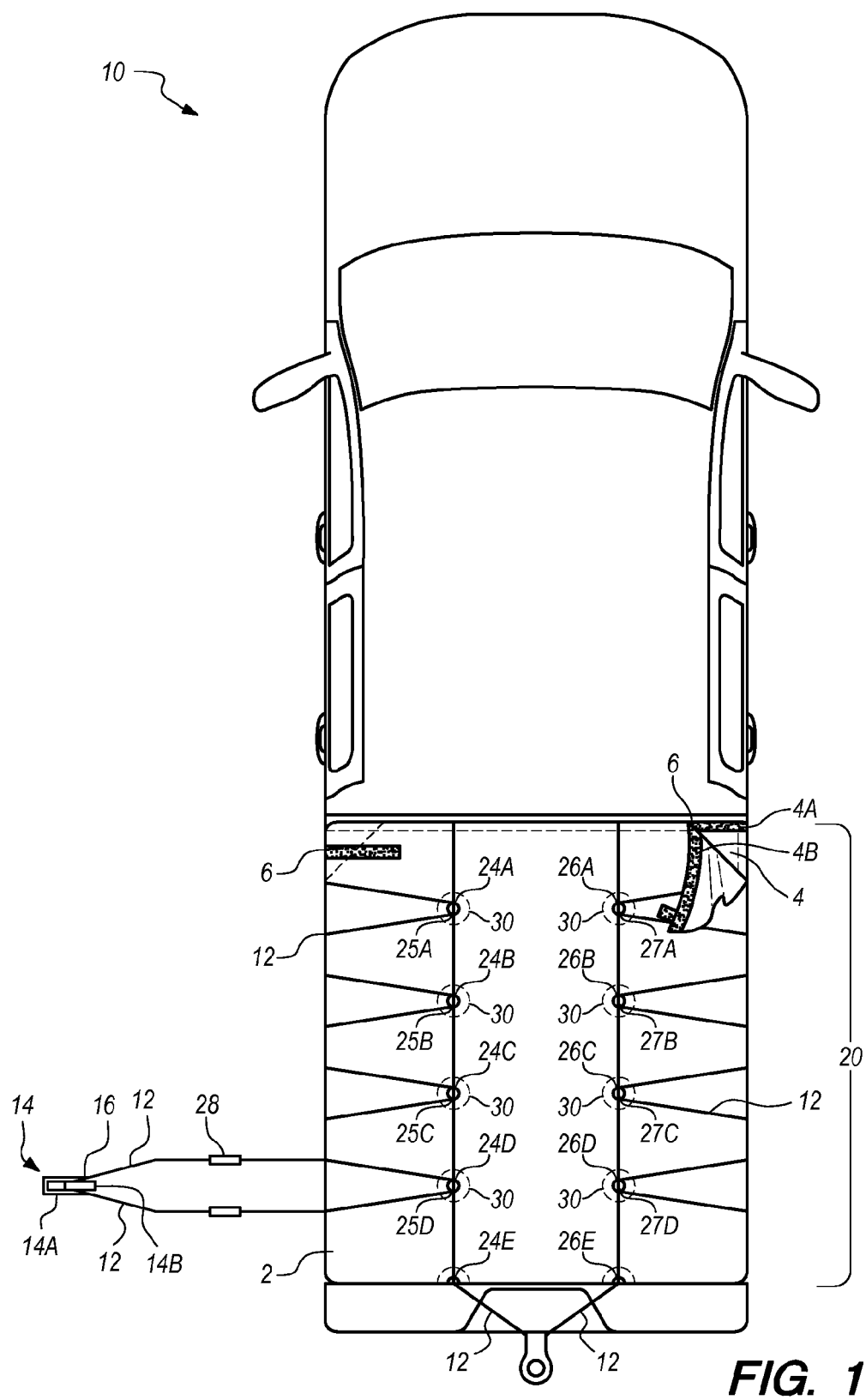
FIG. 1 shows a top view of the fastener assembly of the present invention employing a triangulate corner member for securing a flexible cover over a truck bed according to preferred embodiments of the invention.

FIGS. 1-6 shows a particularly preferred embodiment of the fastener assembly 10 for securing a tarpaulin 2 or any type of flexible cover over truck bed 20 in the particularly preferred embodiment illustrated or any type of open enclosure according to alternative embodiments of the invention. Fastener assembly 10 comprises two triangulate corner members 4, a plurality of tie down members 8 comprising a flexible cord 12, a plurality of anchor members 14 and corresponding magnet stays 16.

According to this particularly preferred embodiment, two triangulate corner members 4 comprise strips of flexible hook material 4A extending in parallel alignment to front upper edges of both triangulate corner members 4. Corresponding strips of coacting loop material 4B are affixed on tarpaulin 2 in orientations to secure tarpaulin 2 in a longitudinally aligned position over the opening of truck bed 20. In the particularly embodiment illustrated, reinforcing strap 6 is affixed proximal to a front edge of tarpaulin 2 and anchored to a frontmost bottom edge of opposing surfaces of truck bed 20 to assure secure aligned attachment of tarpaulin 2 to the upper front portion of truck bed 20.

Figure 2:
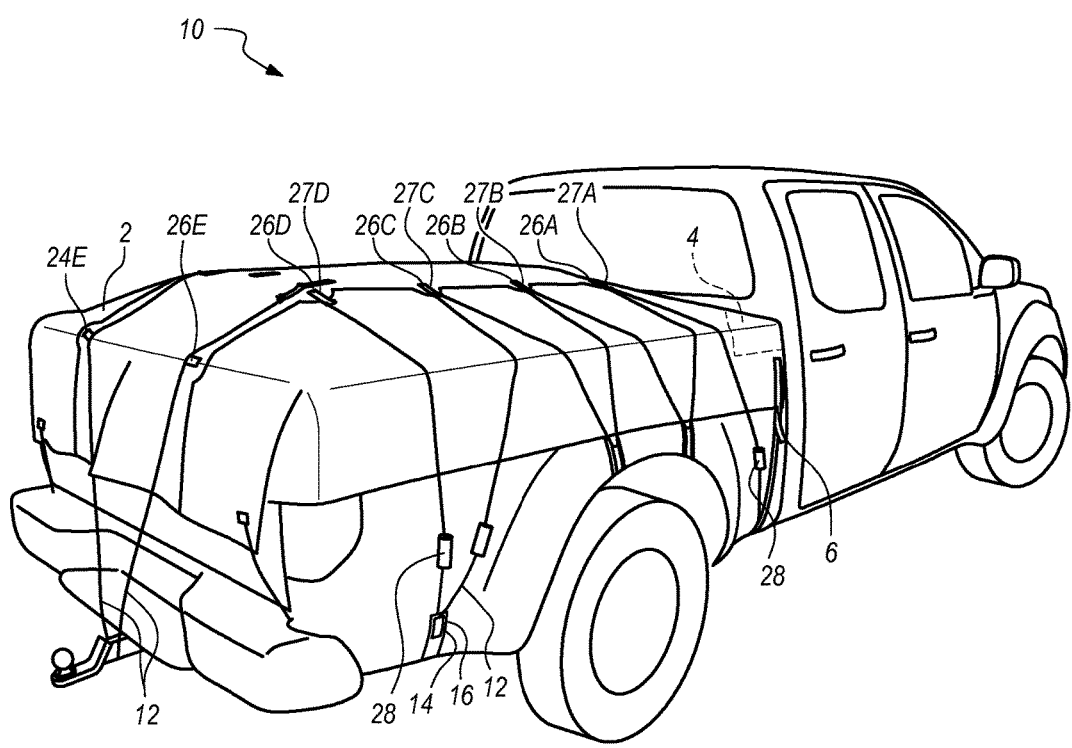
FIG. 2 shows a perspective view of the fastener assembly employing a triangulate corner member for securing a flexible cover over a truck bed of FIG. 1.
Figure 3:
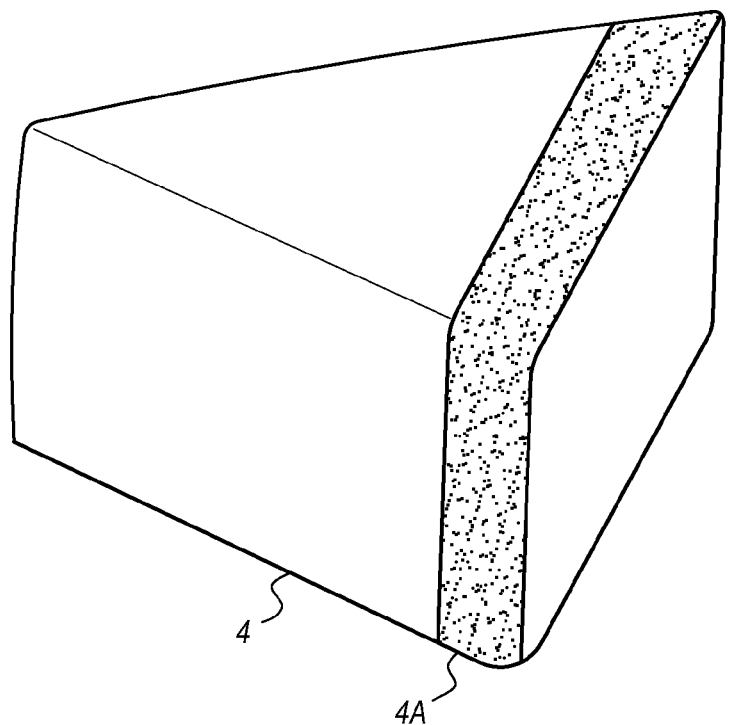
FIG. 3 shows a close up perspective views of a triangulate corner member of the system of FIGS. 1 and 2.

As also shown in FIGS. 1 and 2, affixed to tarpaulin 2 in two rows equally spaced about 18 inches from the midline of the tarp attachment points 24A, 24B, 24C, 24D, and 24E, which are thus symmetrically disposed a total of 36 inches from attachment points 26A, 26B, 26C, and 26D, 26E. In this embodiment, frontmost attachment points 24A and 26A are spaced back 18 inches (45.7 cm) from the front edge of tarpaulin 2. Attachment points 24A, 24B, 24C, 24D, 24E, and 24E and attachment points 26A, 26B, 26C, 26D, 26E, and 26E are spaced apart 15 inches (38 cm) along a longitudinal axis from each other and 18 inches in opposed direction perpendicular from the longitudinally oriented midline of tarpaulin 2.

Fastener points 25A, 25B, 25C, 25D, 25E and 27A, 27B, 28C, 28D on flexible cord 12 are oriented and configured for coupled engagement with respective corresponding attachment points 24A, 24B, 24C, 24D, 24E and 26A, 26B, 26C, 26D, 26E such that fastening of flexible cord 12 by anchor member 14 to opposing side surfaces of the truck bed 20 secures tarpaulin 2 in a stationary, uniformly smooth and tightly extended position in general longitudinal alignment therewith. The particularly preferred embodiment of FIGS. 1 and 2 thus provides for secure attachment of tie down members 8 at predetermined, uniform spaced intervals along a longitudinal axis attachment points 24A, 24B, 24C, 24D, 24E and 26A, 26B, 26C, 26D, 26E. As particularly shown in FIGS. 1 and 2, flexible cord 12 threaded through attachment point 24E and 26E is preferable looped under a hitch assembly if available on a truck bed covered by a fastener assembly 10, as shown. Flexible cord 12 preferably comprises an elasticized material such as a bungee cord.

Figure 4:
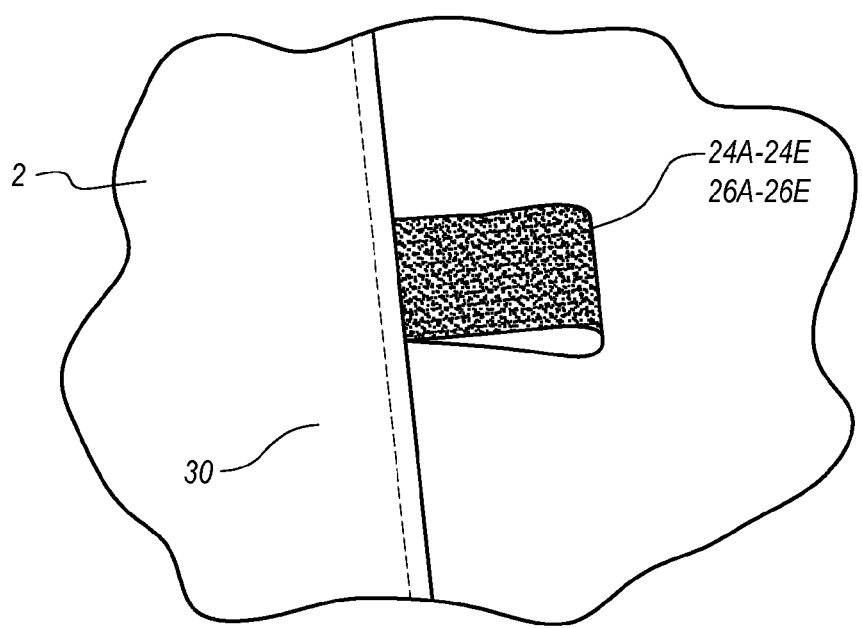
FIG. 4 shows a close up perspective view of the attachment point of FIGS. 1 and 2.

As more clearly depicted in the enlargement of FIG. 4, attachment points 24A, 24B, 24C, 24D, 24E and 26A, 26B, 26C, 26D, 26E comprise looped bands of 0.5 to 1.0 inch (1.25 to 2.5 cm) braided nylon or similar industrial strapping material by bonding to fuse the welded ends of the loops devoid of rough edges thereby avoiding potential damage to the truck bed surface. Particularly preferred embodiments include reinforcement patches 30 affixed adjacent to attachment points 24A, 24B, 24C, 24D, 24E and 26A, 26B, 26C, 26D, 26E to avoid tearing away from tarpaulin 2 at stress points. Such reinforcement patches 30 affixed about attachment points by stitching or preferably radiofrequency affixed to tarpaulin 2 with known stitching, or preferably radiofrequency bonding techniques. In alternative embodiments, attachment points 24A, 24B, 24C, 24D, 24E and 26A, 26B, 26C, 26D, 26E and corresponding fastener points 25A, 25B, 25C, 25D, 25E and 27A, 27B, 27C, 27D, 27E used herein may include any known readily detachable fastener system which can function to adaptively fasten flexible cord 12 of tie down member 8. For example, attachment/fastener points 24A, 24B, 24C, 24D, 24E/25A, 25B, 25C, 25D, 25E and 26A, 26B, 26C, 26D, 26E/27A, 27B, 28C, 28D may employ suitably coupleable and configured loops of woven nylon or polypropylene cord or strapping or other industrial grade textile, S, G or other variously shaped snap hooks, caribiners, cord locks, cams, adjustable sides, loops, D rings eyelets, lever locks, flexible loop material or hook material, slots, buckles, eyelets, clasps, ratchet hooks, strap tie mechanisms or similar commercially available known fasteners.

A further feature of the illustrated embodiment are foam rings 28 preferably elongated to measure between about 1 to 3 inches (2.5 to 7.5 cm) long, 1 to 2 inches (2.5 to 5.0) in diameter and ⅜ inch (0.95 cm) thick with a central hole through which flexible cord 12 is threaded and positioned to cushion points of concentrated friction. Foam rings 28 may comprise polypropylene, soft rubber or other suitable cushioning material which adequately buffers and thereby protects the finish on the truck bed surface from contact friction resulting in scratches or wearing off of the paint.

The particularly preferred embodiments illustrated in FIGS. 1-6 include a further feature of magnet stays 16 attached proximate to anchor members 14 of tie down members 8. Magnet stays 16 are preferably comprised of molybdenum or other suitably magnetic material, and in a particularly preferred embodiment are 3 pound molybdenum magnets enclosed within strapping material attached to anchor members 14. Magnet stays 16 magnetically position anchor members 14 on outer surfaces of the truck bed 20 to thereby enable the user to properly orient tarpaulin 2 in a position aligned with the truck bed 20 and to adjust the relative orientations anchor members 14. After such orientation and adjustment, the plurality of anchor members 14 are detachably anchored to the bottom edges of the truck bed 20 as shown in FIG. 2.

Anchor members 14 detachably affixed to tie down members 8 of the particularly preferred embodiment illustrated in FIGS. 1 and 2 preferably employ a hook 14A and a lever lock 14B. Flexible cord 12 can be threaded through lever lock 32 to adjustably lock flexible cord 12 in tightened position. Hooks 14A may be J-shaped and can be referred to as J-hooks 14A. However, hooks 14A may have any number of shapes, for example, they may be C-shaped, G-shaped, U-shaped or be a flexibly adjustable rigid material adaptable to a corresponding anchor point. Hooks 14A and lever locks 14B may further employ a ratchet mechanism to enhance the tightening capacity of lever locks 14B. Such and other components of tie down members 8 and anchor members 14 are preferably fused by radio frequency bonding for seamless attachment without rigid edges or protrusions and thereby protects against scratching or otherwise damaging the vehicle surface.

A particularly facile aspect of the preferred embodiment shown in FIGS. 1 and 2 employ a plurality of magnet stays 16 affixed to plurality of tie down members 8. Magnet stays 16 magnetically affix anchor members 14 temporarily in their respective positions on opposing surfaces of the truck bed 20 to enable the user to readily detach and reattach anchor members 14 while orienting and smoothing tarpaulin 2 in a position aligned with the truck bed 20 and thereby adjust orientations of anchor members 14 prior to anchoring C hooks 14A. After tarpaulin 2 and magnetic stays are aligned, anchor members 14 are detachably anchored to the bottom edges of the truck bed 20 as shown in FIG. 2. To maximally tighten down tie down members 8, the illustrated particularly preferred embodiment employs lever lock 14B through which flexible cord 12 is threadably locked and thereby ratcheted to adaptively tighten down flexible cord 12 and thereby tautly secure tie down member 8 and tarpaulin 2 in a uniformly smooth and tightly extended position in general longitudinal alignment over the opening of truck bed 20 and any cargo therein.

Figure 5:
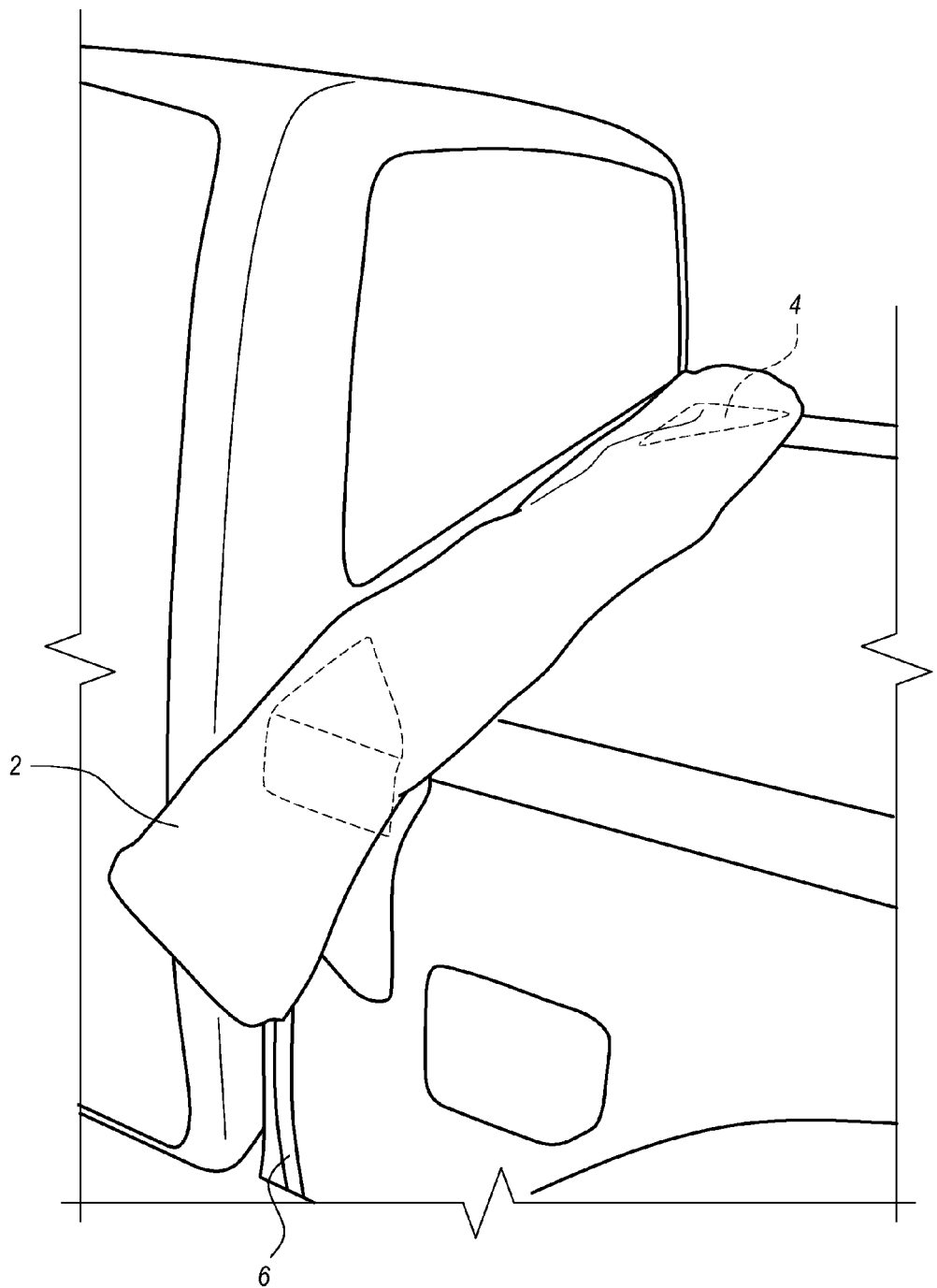
FIG. 5 shows the fastener assembly of FIGS. 1 and 2 with the flexible cover rolled back when not in use.

A yet further feature provided by the illustrated embodiment of the present invention depicted in FIG. 5 comprises a facile and tidy roll into which tarpaulin 2 is readily bundled when not in use as a cover. By disengaging anchor members 14 and rolling back tarpaulin 2 toward the front end of truck bed 20 where it remains fastened to triangulate corner members 4 as described above, tie down members 8 and their components neatly nestle between the roll layers and then secured down by reinforcing straps 6. Tarpaulin 2 is thus maintained in a rolled position over triangulate corner members 4 and reinforcing straps 6 which remain secured to the front wall of truck bed. This rolled position opens the truck bed 20 for loading and unloading cargo without requiring complete disassembly and removal of fastener assembly 10.

Repositioning tarpaulin 2 from its rolled position is equally facile-tarpaulin 2 is readily unrolled from the front wall of truck bed 20 back over to cover the opening of truck bed 20 whereby orienting attachment points/fastening points and securing anchor members 14 should entail minimal adjustment. This facile system is readily implemented by one person without any climbing, stretching and straining to find edges and holes onto which anchor members may be secured. Beyond providing a facile, user-friendly system, the synchronized counterbalancing of the components of fastener assembly 10, i.e., triangulate corner members and the corresponding flexible loop and hook strips of the corner member and tarpaulin, tie down member fastener points, attachment points, and tie down members fastener points and anchor members provide a synchronized system which safely secures cargo, protects, the surface of the truck bed, appears professional and tidy, and easily assembled and disassembled by a single user.

It is noted that the aforedescribed particularly preferred embodiment of the present invention presents in detail one of numerous potential applications, combinations, subcombinations and permutations thereof. For example, alternative embodiments may employ four triangulate members spaced along an adaptive strap such that tightening the strap coupleably seats the four triangulate members upon corresponding corners of a pickup truck bed to secure a flexible cover over which the cornered straps are mounted. Conjunctively and alternatively to the strap, flexible cords, preferably elasticized bungee cords, may be secured in parallel, criss-crossed or webbed configurations. Similarly, it can be appreciated by those of ordinary skill in the art that the above-described assembly and steps may be performed in any order, additional related steps may be performed, and certain components and steps may be modified or omitted to provide a similar assembly and purpose.

Although certain preferred and alternative embodiments and methods have been described in some detail, for clarity of understanding and by way of example, it will be apparent from the foregoing disclosure to those skilled in the art that variations, modifications, changes, and adaptations of such embodiments and methods may be made without departing from the true spirit and scope of the invention. Therefore, the above description should not be taken as limiting the scope of the invention which is defined by the appended claims.

What is claimed is:

1. A fastener assembly for securing a flexible cover about an open enclosure having angled corners, comprising:
   at least one triangulate corner member coupleably mountable upon the angled corners of the open enclosure, wherein the corner member has a fastener mechanism for detachable fastening to the flexible cover to thereby keep the flexible cover over the open enclosure in a generally longitudinally aligned orientation;
   one or more tie down members removeably attachable to the flexible cover; and
   a plurality of fastener members removeably attachable to the one or more tie down members and the open enclosure, whereby simultaneously attaching the plurality of fastener members to the one or more tie down members and the open enclosure secures the flexible cover over an opening of the open enclosure.

2. The fastener assembly of claim 1, wherein the one or more tie down members comprise flexible cords having a plurality of fastener points and wherein the flexible cover further comprises a plurality of corresponding attachment points spaced along the flexible cover at intervals whereby removeably attaching the plurality of fastener members to opposing side surfaces of the open enclosure maintains the flexible cover in a stationary, uniformly smooth and tightly extended position.

3. The fastener assembly of claim 2, further comprising magnet stays for orienting the fastener members along the opposing side surfaces of the open enclosure until securing each fastener member to the open enclosure.

4. The fastener assembly of claim 3, further comprising reinforcement material surrounding the attachment points spaced along the flexible cover.

5. The fastener assembly of claim 1, wherein the fastener mechanism comprises at least one first fastener strip on the triangulate corner member coactively attachable to a corresponding second fastener strip configured and affixed on the flexible cover such that coupled engagement of the first fastener strip and the second fastener strip affixes the flexible cover to the triangulate corner member.

6. The fastener assembly of claim 5, wherein the first fastener strip comprises at least one strip of flexible hook material and the second fastener strip comprises at least one corresponding coacting flexible loop material.

7. The fastener assembly of claim 5, wherein the at least one triangulate corner member comprises two triangulate corner members and the first fastener strip comprises at least one strip of flexible hook material on an outer surface of the two triangulate corner members and the second fastener strip comprises a coacting flexible loop material oriented on an inner surface of the flexible cover such that engagement of the flexible hook material and coacting flexible loop material orients the flexible cover in general alignment with a longitudinal axis of the open enclosure and wherein the flexible cover has a plurality of attachment points and the one or more tie down members comprise an elasticized cord having corresponding fastener points coupleable with the attachment points for adaptive attachment over the flexible cover.

8. The fastener assembly of claim 1, wherein the plurality of fastener members comprises at least one eyelet oriented and configured for adaptive, coupled engagement with a corresponding tie down member to thereby secure the flexible cover over the open enclosure and any cargo therein.

9. The fastener assembly of claim 1, wherein the one or more tie down members comprise elasticized cords for adaptive attachment to the open enclosure.

10. The fastener assembly of claim 9, wherein the elasticized cords are interlaced to form a flexible web over the open enclosure and any cargo therein.

11. The fastener assembly of claim 1, wherein the plurality of fastener members comprises at least one locking lever oriented and configured for adaptive coupled engagement with a corresponding removeably engageable strap for fastening about the flexible cover to thereby secure the flexible cover over the open enclosure and any cargo therein.

12. The fastener assembly of claim 11, wherein the at least one locking lever is ratcheted to adaptively tighten the one or more tie down members such that the flexible cover is thereby tautly secured over the open enclosure and any cargo therein.

13. The fastener assembly of claim 1, wherein the flexible cover is a tarpaulin.

* * * * *